United States Patent [19]

Bisson et al.

[11] Patent Number: 5,714,182
[45] Date of Patent: Feb. 3, 1998

[54] WHEY PROTEIN AND CASEIN CO-PRECIPITATE FOR TEXTURIZING DAIRY PRODUCTS

[75] Inventors: Jean-Pierre Bisson, Caen, France; Giovanni Prella, Vercelli, Italy

[73] Assignee: Nestec S.A., Vevey, Switzerland

[21] Appl. No.: 503,983

[22] Filed: Jul. 19, 1995

[30] Foreign Application Priority Data

Aug. 13, 1994 [EP] European Pat. Off. ............ 94112683

[51] Int. Cl.⁶ ............................ A23C 21/02; A23C 21/06
[52] U.S. Cl. ............................ 426/34; 426/36; 426/38; 426/40; 426/41; 426/491; 426/519; 426/522; 426/582; 426/583
[58] Field of Search ............................ 426/583, 582, 426/491, 519, 522, 34, 36, 38, 40, 41

[56] References Cited

U.S. PATENT DOCUMENTS

| | | |
|---|---|---|
| 3,882,256 | 5/1975 | DeBoer . |
| 4,213,896 | 7/1980 | Davis . |
| 4,358,464 | 11/1982 | Soehnlen ............................ 426/583 |
| 4,713,254 | 12/1987 | Childs et al. ............................ 426/582 |
| 4,961,953 | 10/1990 | Singer et al. . |
| 5,096,730 | 3/1992 | Singer et al. . |
| 5,096,731 | 3/1992 | Singer et al. . |
| 5,104,674 | 4/1992 | Chen et al. . |
| 5,143,741 | 9/1992 | Podolski et al. . |
| 5,350,590 | 9/1994 | McCarthy et al. ............................ 426/583 |
| 5,358,730 | 10/1994 | Dame-Cahagne et al. ............................ 426/583 |

FOREIGN PATENT DOCUMENTS

| | | |
|---|---|---|
| 0250623 | 1/1988 | European Pat. Off. . |
| 0283101 | 9/1988 | European Pat. Off. . |
| 0515246 | 11/1992 | European Pat. Off. . |
| 0520581 | 12/1992 | European Pat. Off. . |

OTHER PUBLICATIONS

Bray, "Technologia per il gelato senza grasso" (Technology of fat-free ice cream), Industrie Alimentari—xxx (1991) pp. 117–119.

*Primary Examiner*—Helen Pratt
*Attorney, Agent, or Firm*—Vort & O'Donnell, LLP

[57] ABSTRACT

A texturizing product for dairy products including yogurt and fresh cheese is prepared by adding a quantity of sweet whey proteins to a milk-based raw material to prepare a mixture having a casein:whey protein ratio of from 70:30 to 40:60 and by preparing the mixture so that it has a pH of from 6.1 to 6.7, and then the mixture is heated to obtain a casein and whey protein co-precipitate-containing mixture which then is subjected to shear to obtain the texturizing product. The texturizing product, such as in a dehydrated form, is combined with a milk for preparing a yogurt or fresh cheese.

17 Claims, No Drawings

WHEY PROTEIN AND CASEIN CO-PRECIPITATE FOR TEXTURIZING DAIRY PRODUCTS

BACKGROUND OF THE INVENTION

The present invention relates to texturizing agents for dairy products, based purely on milk components, in particular for yogurts, fresh cheeses, ice creams or sauces.

Many developments have been made in the field of fat substitutes in fat-free dairy products. Improvements in texture have thus been obtained by using micronized whey proteins. For example, reference may be made to U.S. Pat. No. 5,096,731 which concerns a process for improving the texture of low-fat yogurts by addition of microparticulate protein in the concentrated liquid state. According to this document, the protein is heat treated in a controlled manner and subjected to high shear in a digester. The protein used is either casein in the presence of egg white and pectin, or whey protein on its own.

However, products which employ whey on its own as a texturizing agent do not keep with time. It is for this reason that a gelatin-whey protein mixture has been used up to now as a texturizing agent for low-fat products of the yogurt type. Such an agent is suitable from the organoleptic point of view, but the products unfortunately cannot benefit from the name "yogurt" since they contain ingredients unconnected with milk. Moreover, the texturizing agent has to be dissolved separately in hot water before it can be incorporated in milk intended to be used for the production of yogurt.

SUMMARY OF THE INVENTION

The present invention aims at remedying the disadvantages of known methods for improving dairy products, in particular low-fat or fat-free products. A process according to the invention is characterized in that whey proteins are added to a milk-based raw material to obtain a mixture containing casein and whey proteins in a casein:whey protein weight ratio of 70:30 to 40:60, that the mixture pH is optionally adjusted to 6.1 to 6.7 by the addition of an acidifying agent, that the mixture is subjected to heat treatment at 70°–95° C. for 1–15 min so as to form co-precipitates, that the previously heat-treated mixture is optionally subjected to high shear and it is dried.

DETAILED DESCRIPTION OF THE INVENTION

In carrying out the process of the invention, the milk-based raw material may be a skimmed milk or a product equivalent to skimmed milk, for example a sweet buttermilk. Whey proteins are derived from sweet whey and are obtained by a method which maintains their native state to a large extent, for example by ultra-filtration, followed by drying, and they are then in the form of a concentrate. In the context of the invention, "to a large extent in the native state" signifies that the whey proteins are not denatured to any extent, for example to a maximum of 20% during drying.

In order to put the invention into practice, whey proteins are added, for example in powder form, to skimmed milk, at a rate of about 10–13% by weight of dry matter in the mixture, in a casein:whey protein weight ratio of 70:30 to 40:60, preferably 60:40 to 45:55 and advantageously, for example, about 55:45. The pH of the mixture is adjusted to 6.1–6.7, and preferably to about 6.4 by addition, optionally, of an acidifying agent. The acidifying agent may be a food quality acid, for example lactic acid, or may be introduced by lactic fermentation, for example biological acidification for producing the necessary lactic acid. The mixture should be dissolved with stirring for the time necessary to rehydrate the whey proteins, preferably for example for about 30 min.

The mixture then is transferred to an apparatus in which it is treated with heat. One or preferably two scraped-surface exchangers, mounted in series, can be used for this purpose, which ensure a temperature rise for example to about 70°–72° C., followed by a temperature of about 85° C. to 90° C., and a dwell time at this temperature of from 5 min. to about 10 min. The second scraped-surface exchanger can be replaced by a plate exchanger or a tubular exchanger, which ensures a time of passage corresponding to the dwell time at the desired higher temperature indicated previously.

A plate exchanger can also be used and associated with a positive pump, on condition that a progressive rise in temperature is achieved, followed by a dwell time of, for example, about 5 min at about 90° C. Resistance heating, producing an equivalent result, can also be considered. Without wishing to be tied to any particular theory, it may be thought that the heat treatment applied enables whey proteins to be denatured and hydrated, so as to form coprecipitates with casein.

After heat treatment, the heat-treated mixture may be preferably homogenized under stringent conditions, in one or two stages, at an overall pressure of 300–400 bar, preferably in two stages, for example at about 300–350 bar in the first stage and then at 50 bar in the second stage, preferably at a temperature of about 65°– 70° C. As a variant, it is possible to use any apparatus affording high shear, for example a colloid mill or a smoothing device. High shear treatment is necessary for use of the product as a texturizing agent for dairy products of the yogurt or fresh cheese type but is not necessary for manufacturing a skimmed milk substitute.

Once the liquid has been subjected to shear, it is concentrated, for example in an evaporator, and is then spray dried in a drying tower, under moderate conditions, that is to say, conditions that are not too severe.

The texturizing agent prepared by the process of the invention can be used at a rate of from 2 to 6%, preferably about 3% by weight in skimmed milk, or in partially skimmed or whole milk, preferably raw, for organoleptic reasons.

The texturizing agent can be used in fresh fermented products, for example incubated or blended yogurts, fresh cheeses, ice creams and sauces. In case of use in blended yogurts, acidification is not necessary for producing the texturizing agent.

EXAMPLES

The following examples illustrate the invention. Percentages and parts are by weight, unless indicated to the contrary.

Example 1

Raw skimmed milk was mixed with ultrafiltered sweet whey proteins from cheese-making having a degree of denaturing less than 20% in a proportion of casein:whey proteins of 55:45, and the mixture was then stirred for 30 min. The mixture was then acidified to pH 6.4 with a 35% aqueous solution of lactic acid.

The mixture was passed through, over a period of 10 min, two scraped-surface exchangers mounted in series, which ensured a rise in temperature to 70°–72° C. and then to a temperature of 85° C. The fine flocculate thus obtained was cooled to 65°–70° C. in a plate exchanger and then homogenized at the same temperature on a two-head apparatus, at 300 bar on the first head and 50 bar on the second. The homogenized material was then concentrated in a falling float evaporator to give 30–35% dry matter, and the concentrate was then dried in a drying tower with an air current entering at 190° C. and leaving at 90° C. The final powder had a dry solids content of the order of 95%.

Example 2

The procedure was as in Example 1 except that heat treatment was carried out on a plate exchanger at 70° C. and then 90° C., with the time taken being 5 min. The sequence of operations following homogenization was the same as previously.

Example 3

The procedure was as in Example 1 except that acidification bringing the pH to 6.4 took place biologically, with mesophilic or thermophilic lactic ferments.

Examples 4–8

The procedure was as in Example 1 with only the pH being varied before heat treatment. The texturizing agents obtained differed in their functional properties when they were added to low fat incubated yogurts at a rate of 3%, which was shown by their gel strength, measured on a Stevens texture analyser with a 25 mm diameter module, a length of 20 mm and a penetration rate of 1 mm/s, as indicated in Table 1 below.

TABLE 1

| Example | 4 | 5 | 6 | 7 | 8 |
|---|---|---|---|---|---|
| pH | 6.1 | 6.3 | 6.4 | 6.5 | 6.7 |
| Gel strength in g | 100 | 135 | 138 | 172 | 192 |

It will be noted that the gel of Example 4 was soft but however, that of Example 8 was firm.

Examples 9–11

The procedure was as in Example 1, with only the casein:whey proteins ratio being varied before heat treatment. The texturizing agents obtained differed in their functional and organoleptic properties when they were added to low-fat incubated yogurts at a rate of 3%. The results of their organoleptic evaluation by a tasting panel are indicated in Table 2 below.

TABLE 2

| Example | 9 | 10 | 11 |
|---|---|---|---|
| Ratio casein: whey proteins | 70:30 | 55:45 | 40:60 |
| Tasting | Starchy texture | Creamy texture | Breakable and granular texture |

Example 12

3 parts of texturizing agent powder obtained according to Example 1 were dissolved cold in 100 parts of skimmed milk with stirring. Solution was easily achieved. The liquid was then treated by heating at 75° C., homogenizing at 150 bar in two stages, pasteurizing at 105° C. for 2 min and then cooling to 38°–40° C. The liquid was then acidified by adding yogurt ferments consisting of a mixture of lactobacillus bulgaricus and streptococcus thermophilus. 125 ml pots were filled with the acidified liquid, the pots were incubated until pH 4.7 was reached, then cooled to 8° C. and stored at this temperature to obtain a 0% fat incubated yogurt.

As a comparison, fat-free yogurt was manufactured from 100 parts of skimmed milk enriched with 2.75 parts of skimmed milk powder, dissolved cold in the milk, to which a commercial texturizing agent was added consisting of 75% gelatin and 25% whey protein concentrate less than 20% denatured. The texturizing agent was prepared by separately dissolving 0.35 parts in 2.5 parts of water at 70° C., and the solution was then added to the enriched milk. The rest of the operations occurred as indicated above.

Comparative tasting showed that the 0% fat incubated yogurt containing the texturizing agent prepared according to the invention produced a decided improvement in creaminess and fatty sensation. Moreover, manufacture was facilitated due to the fact that it was not necessary to dissolve the texturizing agent separately.

Example 13

3 parts of texturizing agent powder obtained according to Example 1 were dissolved cold with stirring in 100 parts of semi-skimmed milk, containing 11 g/l of fats. The liquid was then treated at 92° C. for 6 min, homogenized at 300 bar and 75° C. in one stage, and then cooled to 40° C. The liquid was then acidified by adding yogurt ferments consisting of a mixture of lactobacillus bulgaricus and streptococcus thermophilus. 125 ml pots were filled with the acidified liquid, the pots were incubated to pH 4.7, then cooled to 8° C. and stored at this temperature to obtain a sweet semi-skimmed natural yogurt.

As a comparison, semi-skimmed sweet yogurt was manufactured from 100 parts of semi-skimmed milk enriched with 3 parts of skimmed milk powder, dissolved cold in the milk.

Comparative tasting showed that the incubated sweet semi-skimmed natural yogurt containing the texturizing agent prepared according to the invention produced a decided improvement in creaminess and fatty sensation.

Example 14

5.5 parts of texturizing agent powder obtained according to Example 1 were dissolved cold with stirring in 100 parts of whole milk containing 35 g/l of fats. The liquid was than treated at 92° C. for 6 min, homogenized at 300 bar and 75° C. in one stage, and then cooled to 40° C. The liquid was then acidified by adding yogurt ferments consisting of a mixture of lactobacillus bulgaricus and streptococcus thermophilus and then incubated in a sterile vat to pH 4.7. The mass was then made smooth with the aid of a valve at a pressure of 1.5 bar, cooled to 8° C. with the aid of a plate exchanger and then 125 ml pots were filled with the smooth liquid and stored at this temperature to obtain a blended whole milk yogurt.

As a comparison, blended whole milk yogurt was manufactured from 100 parts of whole milk enriched with 5.5 parts of skimmed milk powder, dissolved cold in the milk.

Comparative tasting showed that the blended whole milk yogurt containing the texturizing agent prepared according to the invention produced a decided improvement in creaminess.

Example 15

1 part of the texturizing agent prepared according to Example 1 was dissolved cold in 99 parts of skimmed milk with stirring. The liquid was pasteurized at 95° C. for 5 min and then transferred to a sterilized vat kept at 20°–30° C. 1 ml/100 l of animal rennet at 1/10,000th and 1% of mesophilic ferments were then added and the liquid allowed to acidify to pH 4.4. The curds were then separated in a centrifuge with 0.5 mm nozzles so as to obtain a coagulum containing 13 to 19% dry matter. After cooling to 8° C. by means of a tube exchanger, the product was packed in pots which were stored at this temperature to obtain a fresh cheese with 0% fat.

As a comparison, fat-free fresh cheese was manufactured from 100 parts of skimmed milk, without addition of texturizing agent.

Comparative tasting showed that the 0% fat fresh cheese containing the texturizing agent prepared according to the invention produced a decided improvement in creaminess.

We claim:

1. A process for preparing a dairy product comprising:
   adding a quantity of sweet whey proteins to a milk-based raw material containing casein to prepare a mixture comprising casein and the whey proteins in a casein:whey protein ratio of from 70:30 to 40:60 and preparing the mixture so that the mixture has a pH of from 6.1 to 6.7 and then, heating the mixture to a temperature of from 70° C. to 95° C. for from 1 minute to 15 minutes to obtain a casein and whey protein co-precipitate-containing mixture and so that the co-precipitate-containing mixture has a pH of from 6.1 to 6.7 and after heat-treating to obtain the co-precipitate-containing mixture, and subjecting the co-precipitate-containing mixture to shear to obtain a texturizing product and so that the product obtained has a pH of from 6.1 to 6.7; and
   combining the texturizing product with a milk for preparing a dairy product selected from the group consisting of yogurt and fresh cheese and fermenting the milk combined with the texturizing product to obtain the dairy product.

2. A process according to claim 1 further comprising drying the texturizing product to obtain a dehydrated texturizing product and then combining the dehydrated texturizing product with the milk for preparing the dairy product.

3. A process for preparing a dairy product comprising:
   obtaining a texturizing product prepared by a process comprising adding a quantity of sweet whey proteins to a milk-based raw material containing casein to prepare a mixture comprising casein and the whey proteins in a casein:whey protein ratio of from 70:30 to 40:60 and preparing the mixture so that the mixture has a pH of from 6.1 to 6.7 and then, heating the mixture to a temperature of from 70° C. to 95° C. for from 1 minute to 15 minutes to obtain a casein and whey protein co-precipitate-containing mixture and so that the co-precipitate mixture has a pH of from 6.1 to 6.7 and after heat-treating to obtain the co-precipitate-containing mixture, and subjecting the co-precipitate-containing mixture to shear to obtain the texturizing product and so that the product obtained has a pH of from 6.1 to 6.7; and
   combining the texturizing product with a milk for preparing a dairy product selected from the group consisting of yogurt and fresh cheese and fermenting the milk combined with the texturizing product to obtain the dairy product.

4. A process according to claim 1 or 3 wherein the mixture is prepared with a lactic acidifying agent selected from the group consisting of a lactic fermentation agent and lactic acid so that the mixture has the pH of from 6.1 to 6.7.

5. A process according to claim 3 wherein the texturizing product which is combined with the milk for preparing the dairy product is dehydrated.

6. A process according to claim 2 or 5 wherein the dehydrated texturizing product is hydrated in and homogenized with the milk to obtain a homogenized mixture for preparing the dairy product.

7. A process according to claim 6 wherein the raw material is a skimmed milk and the milk for preparing the dairy product is skimmed milk.

8. A process according to claim 1 or 3 wherein the raw material is selected from the group consisting of skim milk and a sweet buttermilk.

9. A process according to claim 1 or 3 wherein the raw material is skimmed milk.

10. A process according to claim 1 or 3 wherein the heating comprises heating to a temperature of from 85° C. to 90° C. and then a dwell time at the temperature of from 85° C. to 90° C.

11. A process according to claim 10 wherein the dwell time is from 5 minutes to 10 minutes.

12. A process according to claim 10 wherein the co-precipitate-containing mixture is homogenized under a pressure of from 300 bar to 400 bar to subject the co-precipitate mixture to shear.

13. A process according to claim 12 wherein the co-precipitate-containing mixture is homogenized at a temperature of from 65° C. to 70° C.

14. A process according to claim 1 or 3 wherein the co-precipitate-containing mixture is homogenized under a pressure of from 300 bar to 400 bar to subject the co-precipitate mixture to shear.

15. A process according to claim 1 or 3 wherein the co-precipitate-containing mixture is homogenized in two stages to subject the co-precipitate mixture to shear, wherein in a first stage, the mixture is homogenized under a pressure of from 300 bar to 400 bar.

16. A process according to claim 1 or 3 wherein the sweet whey proteins of the sweet whey protein quantity have a degree of denaturing of less than 20%.

17. A process according to claim 1 or 3 wherein the casein:whey protein ratio is from 60:40 to 45:55.

* * * * *